G. R. NIXON.
EMERGENCY GAS CUT-OFF.
APPLICATION FILED DEC. 8, 1914.
1,152,338.
Patented Aug. 31, 1915.
2 SHEETS—SHEET 1.
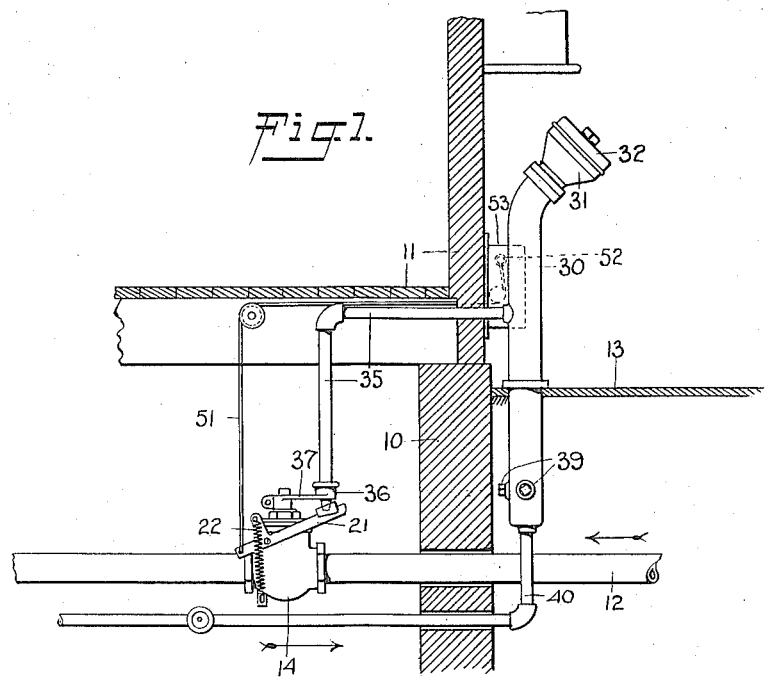
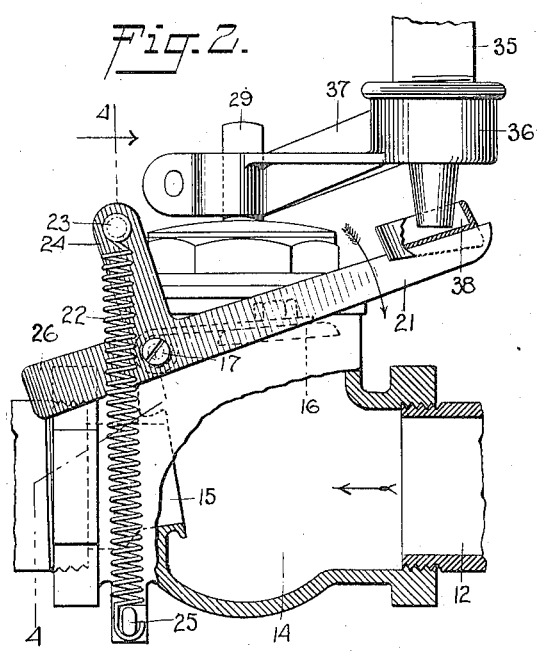
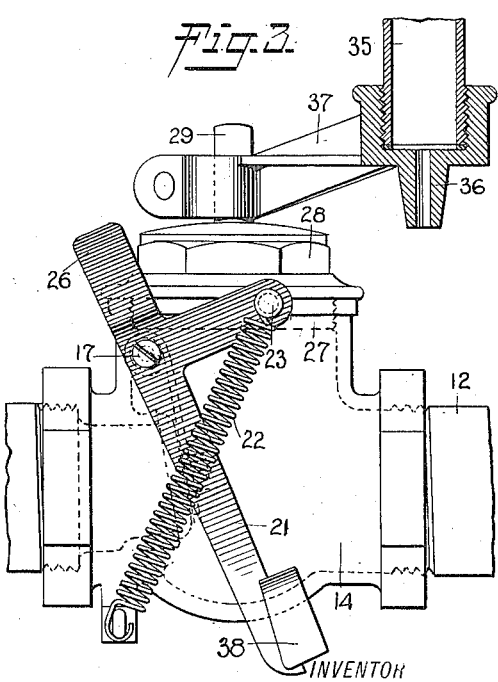
WITNESSES:
INVENTOR
George R. Nixon
BY
ATTORNEYS

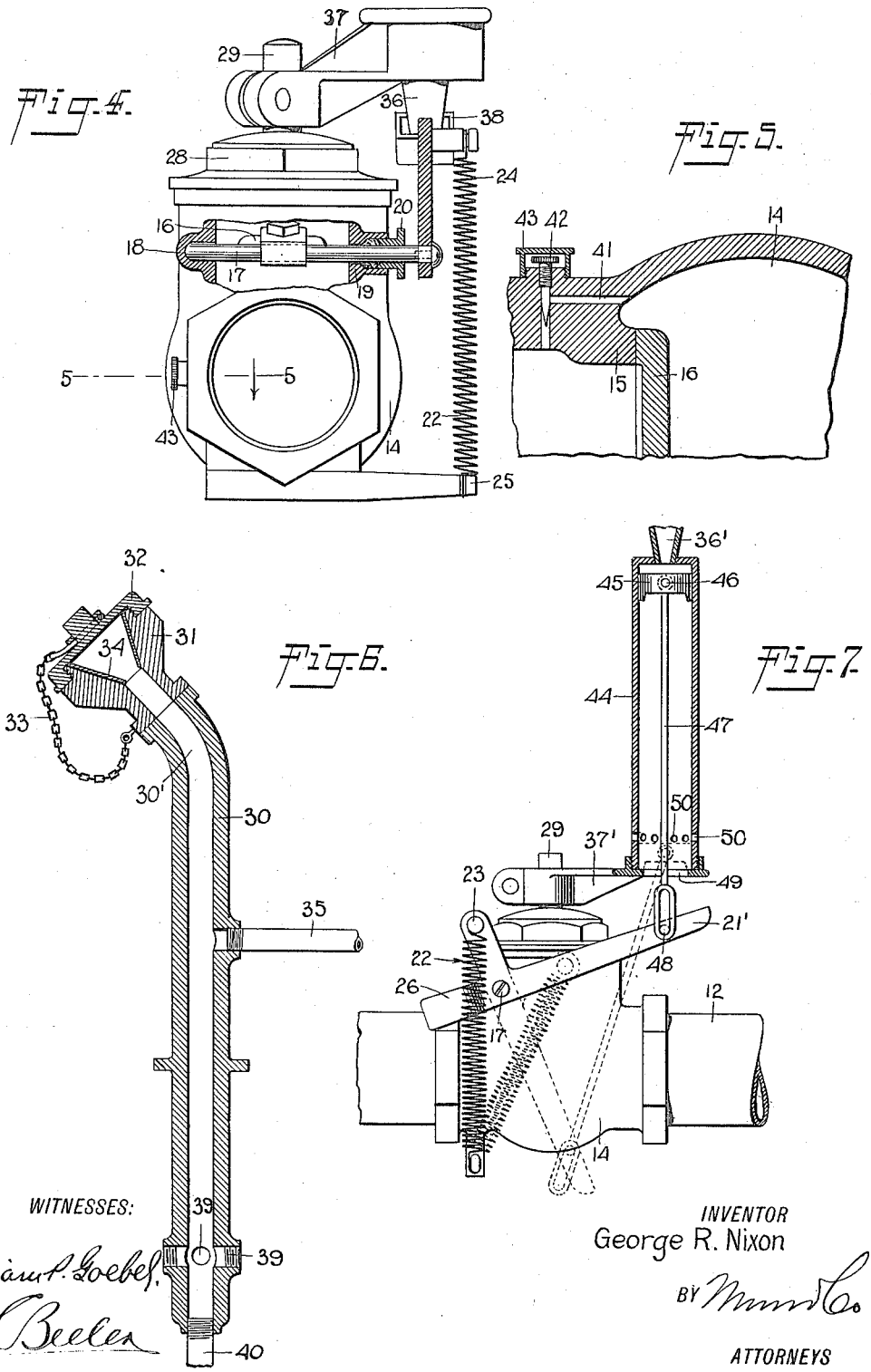

UNITED STATES PATENT OFFICE.

GEORGE R. NIXON, OF PITTSFIELD, MASSACHUSETTS.

EMERGENCY GAS CUT-OFF.

1,152,338.

Specification of Letters Patent. Patented Aug. 31, 1915.

Application filed December 8, 1914. Serial No. 876,122.

*To all whom it may concern:*

Be it known that I, GEORGE R. NIXON, a citizen of the United States, and a resident of Pittsfield, in the county of Berkshire and State of Massachusetts, have invented a new and Improved Emergency Gas Cut-Off, of which the following is a full, clear, and exact description.

This invention relates to gates or valves for use in connection with gas pipes or the like, and has particular reference to a cut-off for gas between the city supply and a building, the device being adapted to be operated to cut off the flow of gas in emergencies such, for instance, as in the event of fire or the like in the building.

More definitely stated, one of the primary objects of the invention is to provide a normally open valve for a gas supply pipe having means associated therewith to enable a fireman or any other person to manipulate the valve to close it from the exterior of the building.

A further object of the invention is to provide a connection for an emergency valve cut-off of such a nature as to enable the application of a stream of water to manipulate the valve, the water being directed toward the valve mechanism through a pipe and from any suitable source, either from the fireman's hose nozzle or from elsewhere.

The foregoing and many other objects of the invention will hereinafter be more fully described and claimed and illustrated in the drawings forming a part of this specification in which like characters of reference indicate corresponding parts in all the views, and in which—

Figure 1 is a side elevation, somewhat diagrammatic, illustrating the general arrangement of the cut-off mechanism and the pipe connections; Fig. 2 is an enlarged view of the same character but referring more particularly to the emergency cut-off, parts being in section; Fig. 3 is a view corresponding to Fig. 2 but with the valve in closed position; Fig. 4 is a rear elevation of the parts shown in Fig. 2, parts being in section on the line 4—4; Fig. 5 is a detail on the line 5—5 of Fig. 4; Fig. 6 is a vertical sectional view of the stand pipe; and Fig. 7 is a view corresponding to Fig. 2, but indicating a slight modification of actuating means for the valve arm.

The several parts of this device may be made of any suitable materials, and the relative sizes and proportions, as well as the general design of the mechanism, may be varied to a considerable extent without departing from the spirit of the invention hereinafter more fully described and specifically claimed.

Referring more particularly to the drawings, I show at 10 a fragment of the foundation wall of a building 11 through which a gas supply pipe 12 leads from the city supply (not shown) and below the street level 13. Located within the building foundation and preferably close to the inner surface is a valve casing 14 connected to the main gas supply pipe preferably as a coupling and having a normally open seat 15. Within the casing 14 is arranged a movable valve 16 shown herein as being rigidly connected to a rock shaft 17 journaled horizontally in bearings 18 and 19 adjacent the rear portion of the top of the casing. The bearing 18 is closed while the other is sealed by means of a packing gland 20. To the end of the rock shaft which projects beyond the casing and gland 20 is rigidly secured a bell crank arm 21, the main portion of which is approximately parallel to the valve 16. In other words, when the valve is open, the longer arm of the bell crank is inclined forwardly and upwardly with respect to the axis of the rock shaft where it is maintained by any suitable means adapting it to be swung together with the valve to the opposite position or with the valve closed against the seat 15. Any suitable counterbalance means may be employed in connection with the arm to normally hold the valve open and to assist in the closing thereof, but for this purpose I show a spring 22 connected at one end to a stud 23 extending outwardly from an arm 24 formed as a part of the bell crank and leading upwardly from the axis of the rock shaft and at substantially a right angle to the main arm thereof. The other end of the spring is connected to a lug 25 formed as a lateral extension from the lower portion of the casing. The arrangement is such that when the bell crank is in normal position, the line of draft of the spring is just back of the line joining the rock shaft and the fixed lug 25, but when the bell crank is swung to close the valve, the line of draft crosses the axis of the rock shaft and is finally exerted on the front side thereof insuring the prompt and effective closing of the valve under the force of the spring in conjunction with any other means which may be employed to initiate the closing action of the valve. The rear end 26 of the bell crank which constitutes an extension of the main arm 21 may be enlarged to act as a counterweight if desired.

The upper portion of the casing 14 or that portion which is at one side of the longitudinal axis thereof constitutes a hub 27 through which access may be had to the valve but normally closed by means of a screw cap 28 to the center of which is secured a rigid post 29. This post is preferably cylindrical and coinciding with the axis of the hub and its nut. While the valve is normally held open by the means above described, it may be closed by hand by an operator in the basement of the building within reach of the lever arm 21, which may be easily performed with the exertion of just enough force to throw the line of force of the spring beyond the axis of the rock shaft 17. I prefer, as above premised, to provide means operative from a distance and on the outside of the building to manipulate the valve.

As shown in Figs. 1 and 6, I provide a stand pipe 30 of peculiar construction and arranged at the front of the building within easy reach of a fireman or other authorized person. The stand pipe includes a head 31 at its upper end, preferably tilted outwardly and normally closed by a cap 32, but which may be easily removed by the application of a hydrant wrench thereto. A chain 33 or the like may be connected to the cap to prevent loss thereof when detached from the head. The inner surface of the head is preferably outwardly flared and lined with lead 34 and having its inner end registering with the bore 30' of the stand pipe. The stand pipe may be planted in the pavement of the street or otherwise secured in rigid position as a part of the permanent structure of the building. A pipe 35 leads laterally from the body of the stand pipe, inwardly and downwardly to a jet 36 carried by a bracket 37 secured to the post 29. The bracket 37 is clamped in proper position to said post after the cap 28 is screwed into position on the casing hub. The jet 36 extends normally into or is located in coöperative relationship with a bucket 38 secured to the forward end of the longer arm 21 of the bell crank. The axis of the jet is so related to the axis of the arm 21 as to form an obtuse angle, and when a stream of water is forced through the pipe 35 and jet, the impulse of such stream impinging against the bucket will throw the arm toward right angular position and thence beyond such position, while the stream of water continues to play upon the bucket and hence carrying the stud 23 beyond the line joining the points 25 and 17. The stream of water may continue to act upon the bucket until the valve is practically closed, but in all events long enough to enable the spring to exert its force to this end.

The stream of water for the purpose just described may be introduced through the head 31 by the fireman's hose nozzle thrust into the lead lined head after the cap 32 is removed. The stream of water thus furnished by the fire nozzle will quickly act to close the gas cut-off. It will be understood that the stand pipe 30 will be normally closed except as above described. With the cap 32 in place, however, closing the upper end of the stand pipe, a stream of water may be introduced into the stand pipe in any other direction or from any other source than that above described.

I show, for example, at 39, a plurality of plugs through which pipe connections may be made according to the local conditions or various requirements, and at 40 I indicate an auxiliary pipe connection with the bottom of the stand pipe through which water may be forced from the interior of the building. These illustrations, however, will be understood as being suggestions of various means through which water may be forced through the stand pipe and jet connection 35.

In municipalities where the gas is delivered at high pressure, it is desirable to provide means to relieve the excessive pressure on the front side of the valve in order to readily reopen the valve after it has been closed. As indicated in Figs. 4 and 5, therefore, I provide a by-pass 41 leading around the valve through the wall of the casing but normally closed by a needle valve 42 accessible from the side of the casing and normally protected by a cap 43. In order to relieve the unbalanced pressure under a condition just described, the operator will remove the cap 43 and unscrew the needle valve so as to open the by-pass 41 and allow the excessive pressure to pass from in front of the valve 16 to that portion of the pipe beyond it, equalizing the pressure, and the needle valve will then be closed. At this time the main valve may easily be swung open and will again be held by the spring 22. In Fig. 7 I show substantially the same type of valve mechanism, but to the post 29 I secure a slightly different form of bracket 37' which supports a power cylinder 44 in which is a sliding piston 45 having pivoted to it at 46 a piston rod 47 having loose pivotal connection at 48 with the bell crank arm 21'. The bracket beneath the cylinder has an opening 49 large enough to accommodate the oscillating movement of the piston rod while the piston reciprocates from one end of the cylinder to the other. Water or other fluid under pressure may be introduced into the upper end of the cylinder above the piston through a jet 36′ and such force acting upon the piston will cause it to rotate the bell crank to close the valve, the force being continued upon the valve closing means practically throughout the movement. A series of holes 50 may be provided near the lower end of the cylinder to discharge the water from the cylinder and bucket preliminary to resetting the mechanism or for indicating to the operator that the piston has been moved far enough for its purpose.

It is obvious that the valve operating bell crank may be manipulated from a distance by other suitable means than a stream of fluid. As indicated, for instance, in Fig. 1, a cord 51 or other flexible connection may have one end attached to the lever and, after operating over any suitably disposed direction pulleys, may be provided at its other end with a ring 52 or other suitable devices to be grasped and preferably housed for protection within a casing 53 having a breakable front.

I claim:

1. In an emergency cut-off, the combination of a casing having a cap thereon with a rigid post projecting outwardly therefrom, a movable normally open valve within the casing, a lever on the outside of the casing rigidly connected to the valve, counterbalance means connected to the lever and serving to normally hold the lever with the valve in open position, a cup carried by the lever, and means to direct a stream of pressure fluid into said cup to overcome the effect of the counterbalance means and initiate the closing movement of the valve, said fluid directing means including a jet nozzle and a bracket supporting said nozzle upon said rigid post, substantially as set forth.

2. In an emergency cut-off, the combination with a gas pipe, a valve casing coupled thereto, and a normally open valve within the casing, of a bell crank lever on the outside of the casing connected to the valve, counterbalance means connected to one arm of the bell crank and normally acting upon one side of the axis of the valve to hold the valve open, a cup carried by the other arm of the bell crank, and means whereby a stream of fluid under pressure may be directed into said cup to act upon said bell crank to cause the counterbalance means to exert its force upon the opposite side of the axis of the valve and close the valve.

3. In an emergency cut-off, the combination with a valve casing, a movable valve within the casing, and a bell crank pivoted on the outside of the casing and connected to the valve, of a spring connected to the bell crank and serving to normally hold the valve in one position, a cup carried by the bell crank remote from the spring, and means associated with the valve casing and serving to direct fluid under pressure into the cup from a distance to rotate the bell crank on its pivot to move the valve toward its other position, the spring subsequently completing such movement, substantially as set forth.

In testimony whereof I have signed my name to this specification in the presence of two subscribing witnesses.

GEORGE R. NIXON.

Witnesses:
  GEO. L. BEELE,
  PHILIP D. ROLLHAUS.